United States Patent [19]

Hattori et al.

[11] Patent Number: 4,969,187
[45] Date of Patent: Nov. 6, 1990

[54] TELEPHONE SET

[75] Inventors: Yoshihiro Hattori; Yoshihiro Tsujita; Masaru Fujita, all of Amagasaki, Japan

[73] Assignee: Mitsubishi Denki Kabushiki Kaisha, Tokyo, Japan

[21] Appl. No.: 363,717

[22] Filed: Jun. 9, 1989

[30] Foreign Application Priority Data

Jun. 13, 1988 [JP] Japan .................... 63-145181

[51] Int. Cl.$^5$ ............................ H04M 1/02
[52] U.S. Cl. .................... 379/433; 379/455; 379/445
[58] Field of Search .............. 379/433, 445, 455, 58, 379/422, 423, 424, 425

[56] References Cited

U.S. PATENT DOCUMENTS 4,609,790  9/1986  Kaiwa et al. .
4,741,034  4/1988  Errichiello et al. ............ 379/455
4,782,528  11/1988  Inoue et al. ................ 379/455

FOREIGN PATENT DOCUMENTS 29255     2/1983  Japan ..................... 379/455
62-16052  4/1987  Japan .

Primary Examiner—Jin F. Ng
Assistant Examiner—M. Nelson McGeary, III

[57] ABSTRACT

In a telephone set, a base unit has a front recess defined by a bottom and a sloping wall including a front part and a rear part, and a rear recess, and a protrusion is provided on the front part of the sloping wall and extends rearward. A locking piece is provided to extend through an aperture formed in the rear part of the sloping wall of the front recess. The locking piece extends toward the protrusion and is pushed toward the protrusion by a spring. The spring permits the retraction of the locking piece into the enclosure of the base unit. A buffer member having a resiliency is provided in the center of the bottom of the front recess. A front dent provided on the front part of the front convex part engages the protrusion. A rear dent provided on the rear part of the front convex part engages the locking piece.

17 Claims, 4 Drawing Sheets

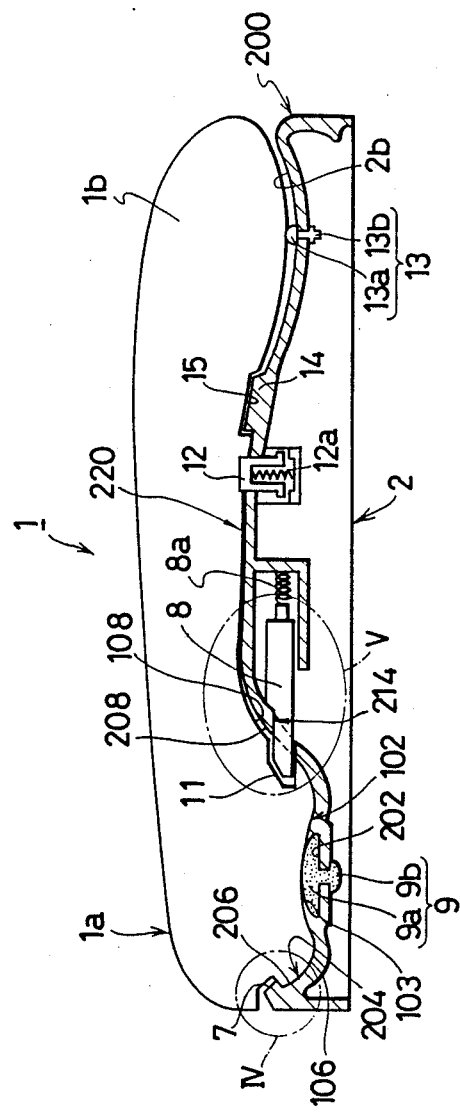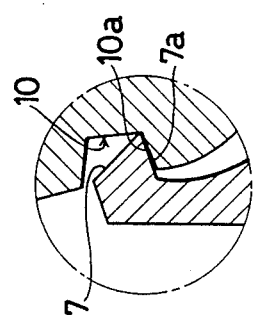

TELEPHONE SET

BACKGROUND OF THE INVENTION

The present invention relates to a telephone set, and in particular to an improvement for preventing jolts due to vibration of the handset mounted on the base unit.

FIG. 1 shows a conventional telephone set. As illustrated, it has a handset 1 with a front convex part 1a which is inserted in a recess 2a of a base unit 2. When the front convex part 1a is inserted in the recess 2a, it is pushed up by a lifter 4 in the recess 2a. If the force of the spring 4a of the lifter 4 is not strong enough, the handset 1 jolts or bumps when the telephone set vibrates. When the force of the spring 4a is too strong, it is difficult to fully insert the front convex part 1a in the recess 2a so that the dent part 5 of the handset 1 cannot be engaged with a locking piece 3, with the result that the handset 1 is not securely held to the base unit 2. Thus, the force of the spring 4a of the lifter 4 is critical. Moreover, an anti-vibration pad 6 disposed in a rear recess 2b is flat so that it does not support a rear convex part 1b with adequate resiliency.

SUMMARY OF THE INVENTION

An object of the present invention is to provide a telephone set which is free from jolts to vibration.

In a telephone set according to this invention, a front dent is formed on the front side of the front convex part of the handset and engages a projection formed on a front wall of a front recess of a base unit, and a rear dent is formed on the rear side of the front convex part and engages a locking piece which can project forward from the rear wall of the front recess and can be retracted during insertion and removal of the front convex part of the handset. The handset is pushed up by a buffer member provided at the bottom of the front recess. The handset is thus securely held to the base unit, and no gaps are created between the handset and the base unit, so no jolts due to vibration occurs.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 3 is a sectional view along line III—III in FIG. 2, with the handset being mounted on the base unit;

FIG. 4 is an enlarged sectional view of part IV in FIG. 3;

DETAILED DESCRIPTION OF THE EMBODIMENTS

Figure 1:
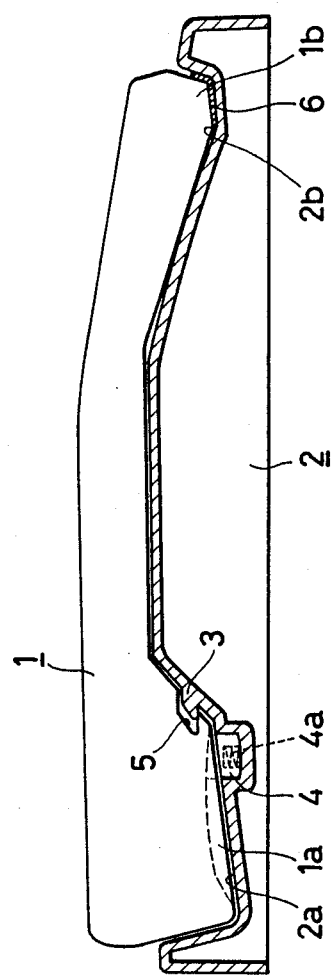
FIG. 1 is a schematic diagram showing an example of prior-art telephone set.

An embodiment of the invention will now be described with reference to FIG. 2 through FIG. 6. The reference numerals identical to those in FIG. 1 denote identical or similar members.

Figure 2:
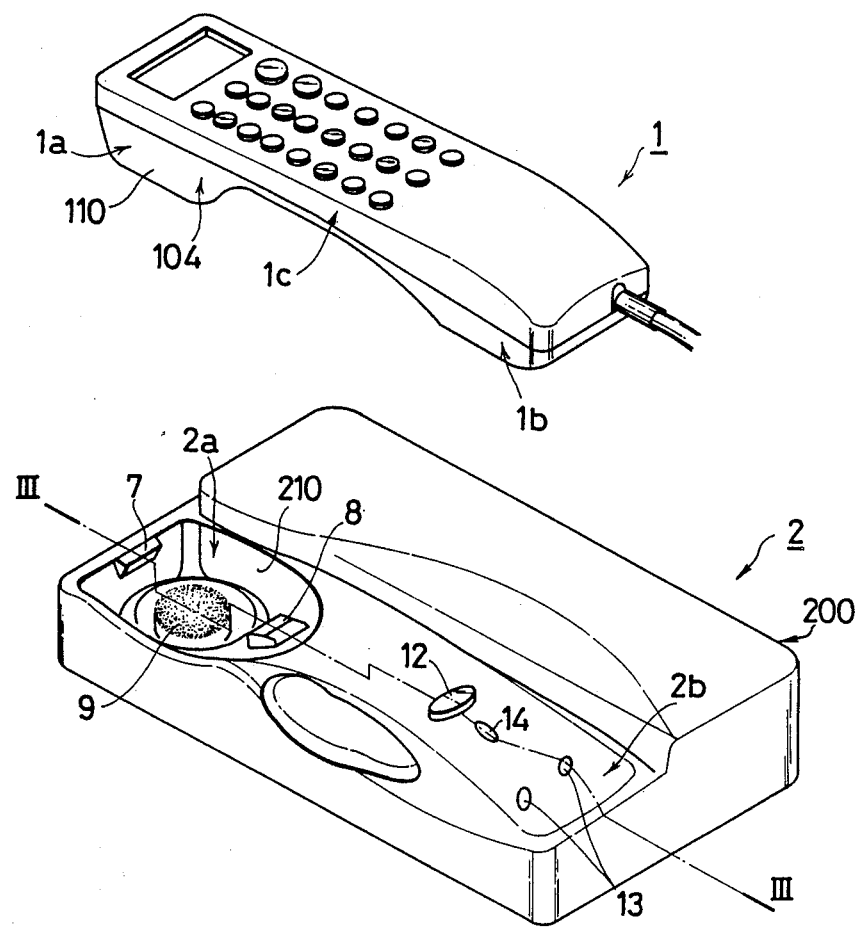
FIG. 2 is an oblique view showing a handset and a base unit according to the invention, the handset being shown in a lifted condition.

The telephone set of this embodiment has a front side on the left side as seen in FIG. 2 and FIG. 3, and a rear side on the right side as seen in FIG. 2 and FIG. 3.

A handset 1 can be placed on an removed from a base unit 2. The handset 1 has a front convex part 1a and a rear convex part 1b, which are connected by a trunk part 1c. The front convex part 1a of the handset 1 has a bottom part 102 having a concave depression 103, and a sloping wall 104 including a front part 106, a rear part 108 and side parts 110.

The base unit 2 has an enclosure 200 formed of a plastic material. It has a front recess 2a and a rear recess 2b for receiving the front convex part 1a and the rear convex part 1b, respectively. More specifically, the front recess 2a has a bottom, and a sloping wall 204 which includes a front part 206, a rear part 208 and side parts 210. The front part 206, the rear part 208 and the side parts 210 respectively conform to the front part 106, the rear part 108, and the side parts 110 of the sloping wall 104 of the front convex part 1a of the handset 1.

Provided at about the upper extremity of the front part 206 of the sloping wall 204 is a protrusion 7 extending rearward.

Figure 5:
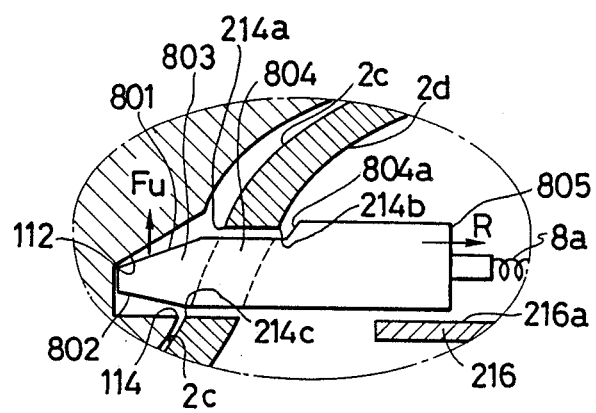
FIG. 5 is an enlarged sectional view of part V in FIG. 3.
Figure 6:
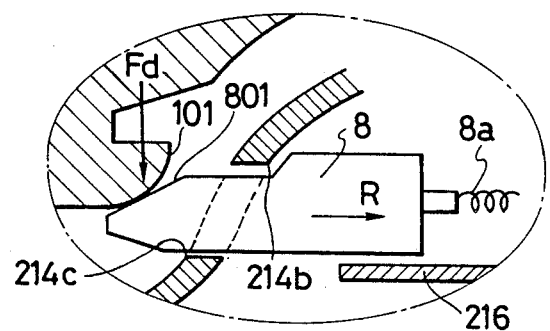
FIG. 6 is an enlarged sectional view of part V in FIG. 3, during the process of insertion of the handset convex part into the base unit recess part.

As is better seen from FIG. 3, FIG. 5 and FIG. 6, the enclosure 200 has, at the rear part of the sloping wall 204, an aperture 214, through which a locking piece 8 extends substantially horizontally. The locking piece 8 has a tapered part 803 and a stem part 804 having a rising part 804a abutting an inner surface of the enclosure 200 at the rear part 208 of the wall 204, and adjacent the upper edge of the aperture 214. The rising part 804a serves as a stop for preventing excessive projection of the locking piece 8. The rear end 805 of the stem part 804 is in engagement with one end of a compression spring 8a, the other end of which is in engagement with a housing 216 connected to and integral with the enclosure 200. The spring 8a pushes the locking piece 8 forward, i.e., toward the protrusion 7, and the resiliency of the spring 8a permits the locking piece 8 to be retracted into the enclosure 200. The tapered part 803 of the locking piece 8 has an upper slant surface 801 and a lower slant surface 802.

The stem part 804 of the locking piece 8 abuts the upper front edge 214a, the upper rear edge 214b and the lower front edge 214c of the aperture 214, and the upper surface 216a of the housing 216. Because of the slope of the rear part 208 of the sloping wall 204 which is at an angle with respect to the front-to-rear direction of the telephone set 1, i.e., the horizontal direction as seen in FIG. 3, the upper front and rear edges 214b and 214c of the aperture 214 are positioned at the rear of the lower edge 214c, so they are positioned midway, along the length of the locking piece 8, between the lower front edge 214c and the upper surface 216a of the housing 216. This structure has the advantage which will be understood from the description given later.

Provided in the center of the bottom part 202 of the front recess 2a is a resilient buffer member 9. The buffer member 9 has a convex part 9a convex upward and an anchor 9b penetrating the enclosure 200 at the bottom 204 of the recess 2a to fix the convex part 9a to the base unit 2. The convex part 9a of the buffer member 9 conforms to the concave depression 103 of the front convex part 1a of the handset 1. The buffer member 9 is formed of rubber or hard plastic sponge.

The front part 106 of the sloping wall 104 of the front convex part 1a of the handset 1 is provided with a dent 10 which engages the protrusion 7. The rear part 108 of the sloping wall 104 of the front convex part 1a of the handset 1 is also provided with a rear dent 11 which engages the locking piece 8. More specifically, the rear dent 11 has a slant surface 112 in abutment with the upper slant surface 801 of the locking piece 8, and an edge 114 which is in abutment with the lower slant surface 802 of the locking piece 8.

Provided on the central elevated part 220 of the enclosure 200 is a lifter 12 which is pushed up by a spring 12a to be pressed against the trunk part 1c of the handset 1.

Provided in the rear recess 2b are a pair of antivibration pads 13 arranged side by side. Each of the antivibration pads 13 has a vertical protrusion 13a extending vertically and having a tip which abuts the rear convex part 1b of the handset 1. Each anti-vibration pad 13 also has an anchor 13b penetrating the enclosure 200 at the bottom of the front recess 2b to fix the vertical protrusion 13a to the base unit 2. The vertical projections 13a of the antivibration pads 13 abut the rear convex part 1b of the handset 1.

Provided on the central elevated part 220 and adjacent to the lifter 12 is a positioning projection 14, which engages a depression or groove 15 in the trunk part 1c of the handset 1.

To place the handset 1 onto the base unit 2, the handset 1 is moved forward, so that the front dent 10 of handset 1 engages the protrusion 7 on the base unit 2. Then, the rear part of the handset 1 is pushed down so that the handset 1 rotates clockwise as seen in FIG. 3 about the protrusion 7 in engagement with the front dent 10. As a result, the rear part 108 of the sloping wall 104 of the front convex part 1a slides over the upper slant surface 801 of the locking piece 8, as indicated by arrow Fd in FIG. 6, and, because of the cam action, the locking piece 8 is retracted as indicated by arrow R in FIG. 6, overcoming the resilient force of the spring 8a. At the same time as the retracting movement of the locking piece 8, the bottom part 102 of the front convex part 1a pushes the buffer member 9 down to compress it. Moreover, the trunk part 1c of the handset 1 presses the lifter 12 downward and the rear convex part 1b presses the anti-vibration pads 13 downward.

When the front convex part 1a of the handset 1 is fully inserted in the front recess 2a of the base unit 2, the locking piece 8 returns to its original position by virtue of the resiliency of the spring 8a, and the rear dent 11 is in engagement with the locking piece 8. In this state, the buffer member 9 presses the handset 1 upward. The edge 114 of the rear dent 11 is pressed against the lower slant surface 802 of the locking piece 8 as indicated by arrow Fu in FIG. 5. The stem part 804 of the locking piece 8 abuts the upper front edge 214a of the aperture 214 and the upper surface 216a of the housing 216, so its rotation is prevented and it resists the upward force Fu exerted from the edge 114 of the rear dent 11 of the handset 1.

The lower surface 10a of the front dent 10 is pressed against the lower surface 7a of the protrusion 7. Moreover, because of their resiliency, the lifter 12 and the antivibration pads 13 exert upward force on the trunk part 1c and the rear convex part 1b, respectively. Because of the engagement and resiliency of the various members, the handset 1 is secured to the base unit 2 without any "gaps" or clearance, so jolts due to vibration is prevented.

Another advantage is that because the handset 1 is resiliently supported by means of the buffer 9, as well as the lifter 12 and the anti-vibration pads 13, and is slightly spaced from the base unit 2, vibration of the handset 1 does not directly affect the base unit 2.

To remove the handset 1 from the base unit 2, the rear part of the handset 1 is moved upward so that the handset 1 rotates counterclockwise as seen in FIG. 3 about the front dent 10 in engagement with the protrusion 7. As a result, the edge 114 of the rear dent 11 is made to slide over the lower slant surface 802 of the locking piece 8 so that, because of the cam action, the locking piece 8 is retracted into the base unit 2 as indicated by arrow R in FIG. 5, overcoming the resilient force of the spring 8. Thus, the rear dent 11 is disengaged from the locking piece 8. Then, the handset 1 is moved rearward, so that the front dent 10 is disengaged from the protrusion 7.

As was described earlier, the abutment of the stem part 804 with the edges 214a, 214b and 214c of the aperture 214, and the upper surface 216a of the housing 216 prevents rotation of the locking piece 8 when the buffer member 9 pushes the handset 1 up. It also prevents rotation of the locking piece 8 in the following situations. First, while the front convex part 1a is pushed into the front recess 2a, and the locking piece 8 is retracted because of the cam action, the stem part 804 of the locking piece 8 abuts the lower front edge 214c and the upper rear edge 214b of the aperture 214, so rotation of the locking piece 8 is prevented. Similarly, while the front convex part 1a is removed from the front recess 2a, and the locking piece 8 is retracted because of the cam action, the stem part 804 of the locking piece 8 abuts the front upper edge 214a of the aperture 214 and the upper surface 216a of the housing 216, so its rotation is prevented. Thus, in either situation, the movement of the locking piece 8 is substantially limited to a linear movement in the direction of the arrow R, as shown in FIG. 5 and FIG. 6.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A telephone set comprising:
   a handset;
   a base unit for mounting said handset thereon;
   said base unit having a front part provided with a protrusion extending substantially rearward;
   a locking piece provided on said base unit and having a front and a rear part, said front part being tapered with an upper slant surface and lower slant surface, wherein said locking piece extends forward towards said protrusion;

a spring for pushing said locking piece forward;

a housing integral with the base unit for receiving the spring and a rear end of the locking piece;

a buffer member having a resiliency, provided on said base unit between said locking piece and said protrusion;

a front dent provided on the front part of said handset to engage said protrusion; and a rear dent provided on said handset to engage said locking piece;

whereby said front dent is made to engage said protrusion, then said handset is rotated about said protrusion in engagement with said front dent to press said buffer member, and then said rear dent is made to engage said locking piece such that locking piece initially engages said handset with the upper slant surface.

2. The telephone set according to claim 1, wherein the rear dent of the handset has a lower edge in engagement with the lower slant surface of the locking piece when either the handset is pushed upwardly by the buffer member or the handset is being removed from the base unit.

3. The telephone set according to claim 2, wherein said locking piece has a stem part extending through an aperture in the base unit, said stem part being in engagement with an upper edge of said aperture, a lower edge of said aperture and an upper surface of the housing.

4. The telephone set according to claim 3, wherein the upper edge of the aperture is positioned midway along a length of the locking piece between said lower edge of the aperture and the upper surface of the housing.

5. The telephone set according to claim 1, wherein said locking piece has an upper rear edge which engages the base unit to prevent movement of the locking piece beyond a predetermined position despite pushing by the spring when said handset is removed from the base.

6. A telephone set comprising:

a handset having a front convex part and a rear convex part, which are connected by a trunk part, said front convex part having a bottom and a wall including a front part and a rear part;

a base unit having an enclosure which has a front recess and a rear recess for receiving said front convex part and said rear convex part, respectively;

said front recess being defined by a bottom and a wall including a front part and a rear part;

a protrusion provided on said front part of said wall of said front recess of said base unit, said protrusion extending substantially rearward;

a locking piece provided to extend through an aperture provided through said enclosure at said rear part of said wall of said front recess, said locking piece extending toward said protrusion and having a tapered part with an upper slant surface and a lower slant surface;

a spring disposed in said enclosure for engaging an end of the locking piece and for pushing said locking piece toward said protrusion and permitting retraction of said locking piece into said enclosure of said base unit;

a housing integral with said enclosure, said housing receiving the spring and the end of the locking piece;

a buffer member having a resiliency, provided on said bottom of said front recess;

a front dent provided on said front part of said front convex part of said handset to engage said protrusion; and a rear dent provided on said rear part of said front convex part of said handset to engage said locking piece;

whereby said front dent is made to engage said protrusion, then said handset is rotated about said front dent in engagement with said protrusion, so that said rear part of said wall of said front convex part pushes the upper slant surface of said locking piece to cause retraction of said locking piece and said bottom part of said front convex part presses said buffer member, and when said handset is fully inserted said locking piece is moved forward so that it projects into said rear dent for engagement therewith.

7. The telephone set according to claim 6, wherein said rear dent of said front convex part has a lower edge which is in engagement with said lower slant surface of said tapered part of said locking piece when said front convex part is pushed upward either by the action of said buffer member or when said handset is being removed from said base unit.

8. The telephone set according to claim 6, wherein said locking piece also has a stem part abutting an upper edge of said aperture, a lower edge of said aperture and an upper surface of said housing.

9. The telephone set according to claim 8, wherein said upper edge of said aperture is positioned midway along a length of said locking piece between said lower edge of said aperture and said upper surface of said housing.

10. The telephone set according to claim 6, wherein said wall of said front convex part of said handset is a sloping wall tapered toward said bottom.

11. The telephone set according to claim 6, wherein said bottom of said front convex part of said handset has a concave depression, and said buffer member has an upwardly extending convex part which conforms to said concave depression in said bottom of said front convex part.

12. The telephone set according to claim 6, wherein said buffer member is formed of rubber or sponge.

13. The telephone set according to claim 6, wherein said base unit has a central elevated part between said front recess and said rear recess, and a lifter provided in said central elevated part which pushes up said trunk part of said handset.

14. The telephone set according to claim 6, wherein said base unit further comprises an anti-vibration pad which is provided in said rear recess, and has a part which is elongated vertically and has a tip to abut said rear convex part of said handset.

15. The telephone set according to claim 6, wherein said handset further comprises a depression in said trunk part, and said base unit further comprises a positioning projection which engages said depression in said trunk part of said handset.

16. The telephone set according to claim 6, wherein said protrusion is provided at about the upper extremity of said front part of said front recess of said base unit.

17. The telephone set according to claim 6, wherein said locking piece has an upper rear edge which engages the enclosure of the base unit to prevent movement of the locking piece into the front recess of the enclosure beyond a predetermined position despite pushing by the spring when the handset is removed from the base unit.

* * * * *